(12) United States Patent
Merck et al.

(10) Patent No.: US 9,868,855 B2
(45) Date of Patent: Jan. 16, 2018

(54) ASPHALT EMULSIFIERS DERIVED FROM PYROLYZED WOOD

(71) Applicant: Pinova, Inc.

(72) Inventors: Ralph Brian Merck, Brunswick, GA (US); Norman Leroy Kennedy, Darien, GA (US)

(73) Assignee: Pinova, Inc., Brunswick, GA (US)

( * ) Notice: Subject to any disclaimer, the term of this patent is extended or adjusted under 35 U.S.C. 154(b) by 446 days.

(21) Appl. No.: 14/210,598

(22) Filed: Mar. 14, 2014

(65) Prior Publication Data

US 2014/0261077 A1 Sep. 18, 2014

Related U.S. Application Data

(60) Provisional application No. 61/791,799, filed on Mar. 15, 2013.

(51) Int. Cl.
*C08L 95/00* (2006.01)

(52) U.S. Cl.
CPC .................................. *C08L 95/005* (2013.01)

(58) Field of Classification Search
CPC .. C09K 3/14; C09G 1/00–1/02; C08L 95/005; C09D 195/005; C08K 5/20
USPC ........................................................ 106/277
See application file for complete search history.

(56) References Cited

U.S. PATENT DOCUMENTS

| | | |
|---|---|---|
| 2,221,540 A | 11/1940 | Hall |
| 4,876,108 A | 10/1989 | Underwood et al. |
| 5,656,733 A | 8/1997 | Suchanec |
| 5,792,340 A | 8/1998 | Freel et al. |
| 5,853,548 A | 12/1998 | Piskorz et al. |
| 5,961,786 A | 10/1999 | Freel et al. |
| 6,512,090 B1 | 1/2003 | Suchanec et al. |
| 6,844,420 B1 | 1/2005 | Freel et al. |
| 7,905,990 B2 | 3/2011 | Freel |
| 2010/0275817 A1* | 11/2010 | Williams et al. ............ 106/671 |

* cited by examiner

*Primary Examiner* — Kaj K Olsen
*Assistant Examiner* — Alexandra M Moore
(74) *Attorney, Agent, or Firm* — Alston & Bird LLP

(57) ABSTRACT

Asphalt emulsifiers and asphalt emulsions comprised of alkali metal or ammonium salts of a biomass pyrolysis oil, such as a pyrolytic wood tar oil, where the biomass pyrolysis oil is used as made from a pyrolysis process with only water washing, are disclosed.

16 Claims, 1 Drawing Sheet

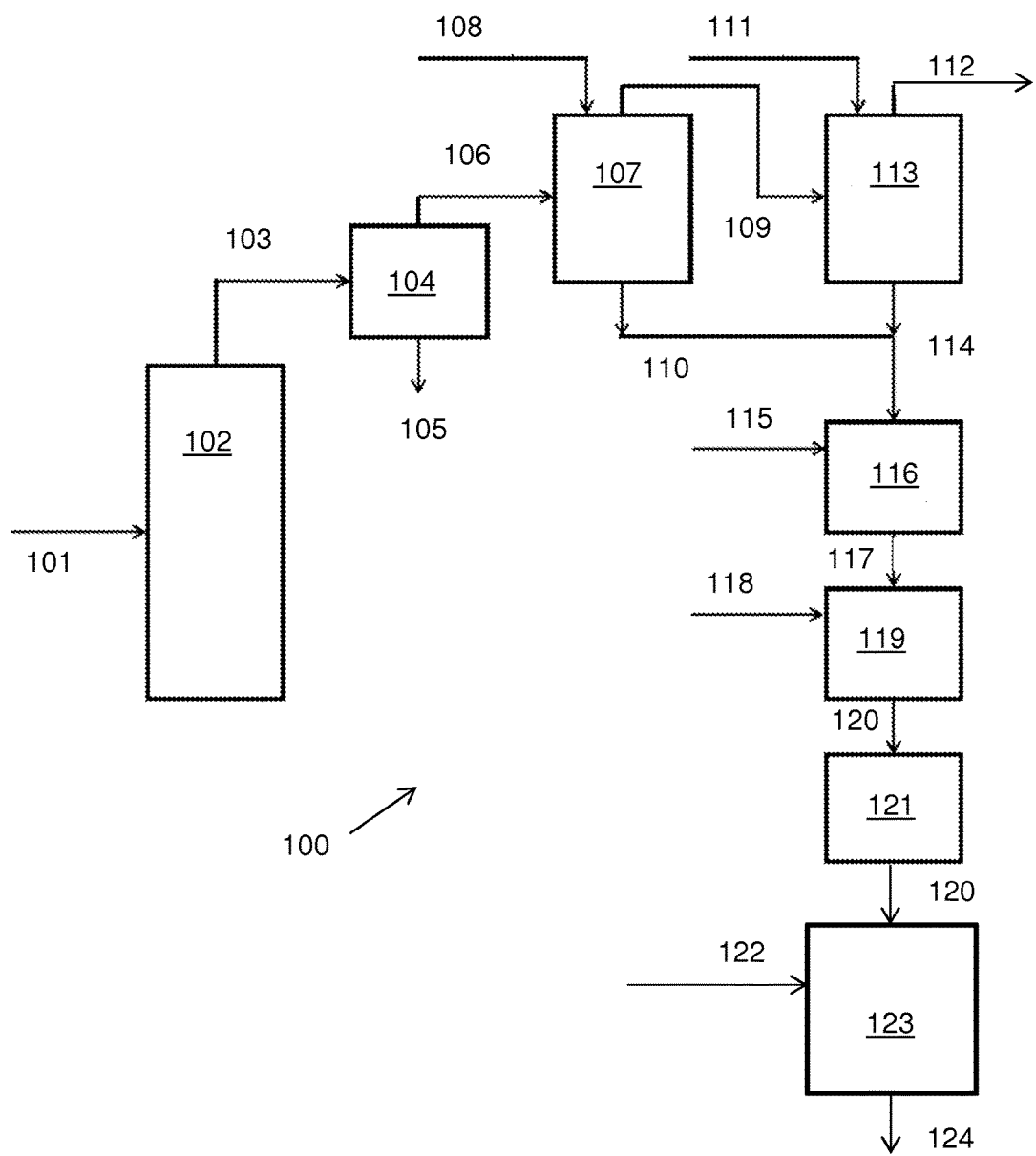

ASPHALT EMULSIFIERS DERIVED FROM PYROLYZED WOOD

CROSS-REFERENCES TO RELATED APPLICATIONS

This application claims benefit under 35 U.S.C. § 119(e) to U.S. Provisional Application No. 61/791,799; filed: Mar. 15, 2013; titled: "Asphalt Emulsifiers" is hereby incorporated by reference in its entirety.

BACKGROUND

1. Field

The invention relates generally to asphalt emulsifiers, asphalt emulsions and methods to produce the emulsifiers.

2. Description of the Related Art

In the manufacture of pale wood rosin from southern pine stumpwood, crude rosin is extracted from the wood and then refined using solvent/solvent partitioning between aliphatic hydrocarbon and polar solvents. One of the by-products of this operation is a dark, high melting, largely aliphatic hydrocarbon-insoluble resin, hereinafter referred to as AHI resin. AHI resin is a thermoplastic resin that chemically is a complex mixture of high molecular weight phenolic compounds, rosin acids, neutral materials and several minor components. An AHI resin is produced as described in U.S. Pat. No. 2,221,540, which patent is incorporated herein by reference in its entirety. A preferred AHI resin is Vinsol® resin available from Pinova, Inc., Brunswick, Ga.

AHI resin, particularly Vinsol® resin from Pinova, Inc., Brunswick, Ga., is used in a wide variety of industrial applications including asphalt emulsions. Asphalt emulsions are used in a variety of applications such as road building, road sealing, soil stabilization, mulching, surface coating of asphalt pavements, and built-up roofs. The amount of wood rosin available by solvent partitioning is limited by the process equipment, and by environmental and cost constraints. Because the amount of wood rosin produced is limited, the supply of AHI resin available for industrial applications is also limited. Consequently, there is a need for a material which will perform in asphalt emulsions in a manner similar to AHI resin. Furthermore, it is desirable for asphalt emulsifiers to be produced with processes as green as possible. Green processing involves "minimal to no" hazardous materials, and minimal waste.

U.S. Pat. No. 5,656,733 describes resinous compositions comprising lignin and polymerized rosin, and the use of such compositions as asphalt emulsifiers and air entraining agents for concrete. U.S. Pat. No. 6,512,090 describes asphalt emulsions that are produced from reactions of solutions of alkali metal hydroxides and ammonium hydroxide with solidified pyrolytic wood tar. In this process, pyrolytic wood tar oil is produced by the fast pyrolysis of pine wood followed by rapid quenching of the gas product vapors. The pyrolytic wood tar is then subjected to carefully controlled distillation and evaporation of the volatiles including water, which also produces cross linking of reactive sites on the lignin fragments.

BRIEF SUMMARY

Various embodiments relate to an asphalt emulsifier. The asphalt emulsifier can include at least one salt of a biomass pyrolysis oil with one selected from the group consisting of an alkali metal, and ammonia. A salt of a biomass pyrolysis oil with an alkali metal means the same as an alkali metal salt of a biomass pyrolysis oil. A salt of a biomass pyrolysis oil with ammonia means the same as an ammonium salt of a biomass pyrolysis oil. For example, the salt can be produced by a process comprising reacting the biomass pyrolysis oil with a hydroxide of lithium, sodium, potassium, and/or ammonia. Additionally or alternatively, the salt can be produced by a process comprising reacting the biomass pyrolysis oil with an oxide of lithium, sodium, potassium, and/or ammonia. The asphalt emulsifier can also include a plurality of salts of the biomass pyrolysis oil and an alkali metal, ammonia, and combinations thereof.

Various embodiments relate to a process including, but not limited to the steps of washing a biomass pyrolysis oil with water to produce a washed biomass pyrolysis oil; and treating the washed biomass pyrolysis oil to produce an asphalt emulsifier comprising at least one salt of a biomass pyrolysis oil with one selected from the group consisting of an alkali metal, and ammonia. The step of treating the washed biomass pyrolysis oil can include reacting the washed biomass pyrolysis oil with a hydroxide of lithium, sodium, potassium, and/or ammonia. The step of treating the washed biomass pyrolysis oil can include reacting the washed biomass pyrolysis oil with a hydroxide of lithium, sodium, potassium, and/or ammonia; and repeating the reacting step at least once to obtain the asphalt emulsifier with a desired pH. Additionally or alternatively, treating the washed biomass pyrolysis oil can include reacting the washed biomass pyrolysis oil with an oxide of lithium, sodium, potassium, and/or ammonia. The step of treating the washed biomass pyrolysis oil can include reacting the washed biomass pyrolysis oil with an oxide of lithium, sodium, potassium, and/or ammonia; and repeating the reacting step at least once to obtain the asphalt emulsifier with a desired pH. The desired pH can be from about 7 to 14 or any other pH of the asphalt emulsifier as specified in this disclosure.

Various embodiments relate to an asphalt emulsion including an asphalt, water, and an asphalt emulsifier. The asphalt can be suspended in the water. The asphalt emulsifier can include at least one salt of a biomass pyrolysis oil with an alkali metal, and/or ammonia. The asphalt emulsion can further include one or more additional asphalt emulsifiers. The one or more additional asphalt emulsifiers can include an alkali metal salt, an ammonium salt, and combinations thereof. The alkali metal salt can include an alkali metal, including but not limited to lithium, sodium, and potassium.

Various embodiments relate to a process for preparing an asphalt emulsion, the process can include the steps of combining an asphalt emulsifier with an asphalt in an inline mixer, a piping system, and combinations thereof to produce a mixture; processing the mixture in one selected from the group consisting of a colloid mill, a homogenizer, and combinations thereof to produce the asphalt emulsion, wherein the asphalt emulsifier comprises at least one salt of a biomass pyrolysis oil with one selected from the group consisting of an alkali metal, and ammonia.

Various embodiments relate to a process for preparing an asphalt emulsion, the process comprising: mixing an asphalt emulsifier solution with an asphalt by combining the streams in an inline mixer or piping system, and feeding the mixture to a colloid mill (or similar high-speed, high-shear homogenizer) which produces the asphalt emulsion, wherein the asphalt emulsifier comprises at least one salt of a biomass pyrolysis oil with one selected from the group consisting of an alkali metal, and ammonia.

BRIEF DESCRIPTION OF THE DRAWINGS

These and other features, aspects, and advantages of the present disclosure will become better understood with ref- FIG. 1: shows a schematic flowchart illustrating one embodiment for producing an asphalt emulsifier.

It should be understood that the various embodiments are not limited to the arrangements and instrumentality shown in the drawings.

DETAILED DESCRIPTION

Various embodiments relate to aqueous based asphalt emulsifiers that are alkali metal or ammonium salts of a biomass pyrolysis oil, such as a pyrolytic wood tar oil or a bio-oil that has not been heat treated or otherwise modified to change its physical state or to change its composition through depolymerization or polymerization reactions.

Various embodiments relate to washing of the condensed vapors from the pyrolysis of wood or of another biomass, i.e., a biomass pyrolysis oil, with water to remove water soluble components as the only pre-treatment, followed by reaction of the washed biomass pyrolysis oil, which is reacted with an alkali metal hydroxide or ammonium hydroxide to produce an aqueous asphalt emulsifier.

Various embodiments relate to the reaction of alkali metal hydroxides or ammonium hydroxide with a biomass pyrolysis oil that is used as produced from a pyrolysis reactor, that is with no water washing or distillation/evaporation to solidify or heat treat the biomass pyrolysis oil, to produce an aqueous asphalt emulsifier.

Various embodiments relate to the reaction of a mixture of two or more alkali hydroxides or ammonium hydroxide with a biomass pyrolysis oil that is optionally washed with water as the only pre-treatment (to produce, for example, a pyrolytic wood tar oil), to produce an aqueous asphalt emulsifier.

According to various embodiments, an asphalt emulsion is prepared by (a) reacting a biomass pyrolysis oil, such as a bio-oil or a pyrolytic wood tar oil, with an alkali hydroxide, or with ammonium hydroxide to produce an aqueous solution of an emulsifier, (b) mixing the aqueous solution of emulsifier with an asphalt to form a mixture, and (c) milling the mixture to form an emulsion of the asphalt.

As used herein, the term "asphalt" refers to a dark, viscous semi-solid that occurs naturally but is usually derived from the refining of petroleum. Asphalt is used as a binder in the production of asphalt cement (or asphalt concrete) for road construction and paving projects. Asphalt is also called bitumen.

Various embodiments may be understood more readily by reference to the following detailed description of preferred embodiments as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

For purposes of the present disclosure, the term "biomass pyrolysis oil" is defined as condensed vapors derived from pyrolysis of a biomass. Exemplary biomass pyrolysis oils include, but are not limited to a pyrolytic wood tar oil, or a bio-oil. The biomass pyrolysis oil can optionally be water-washed. The term "bio-oil" is not always used consistently in the prior art. The term "bio-oil" is referred to by many other names in various bodies of literature and prior art, including pyrolysis oils, bio-oil, pyrolysis liquids, wood liquids, wood oil, liquid smoke, wood distillates, pyroligneous acid and liquid wood. In the present disclosure, all of these names are considered to be "bio-oils." A bio-oil is a "biomass pyrolysis oil" as long as the bio-oil is obtained from the condensed vapors derived from pyrolysis of a biomass.

For purposes of the present disclosure, the term "biomass" refers to a biological material derived from living, or recently living organisms. It most often refers to plants or plant-based materials which are specifically called lignocellulosic biomass. Wood remains the largest biomass energy source today; examples include forest residues (such as dead trees, branches and tree stumps), yard clippings, wood chips and even municipal solid waste. In the second sense, biomass includes plant or animal matter that can be converted into fibers or other industrial chemicals, including biofuels. Industrial biomass can be grown from numerous types of plants, including miscanthus, switchgrass, hemp, corn, poplar, willow, sorghum, sugarcane, bamboo, and a variety of tree species, ranging from eucalyptus to oil palm (palm oil). According to certain particularly preferred embodiments, the biomass can include wood, for example, from hardwood and softwood species.

The biomass pyrolysis oil, such as a wood tar oil or a bio-oil, for use in various embodiments can be produced first by thermal destructive distillation; for example, fast pyrolysis of biomass, e.g., wood. The conception of fast pyrolysis and its evolution into a practical method of producing fuels and chemicals from biomass is described in U.S. Pat. No. 7,905,990, which is incorporated herein by reference in its entirety. The very first biomass pyrolyses were slow in comparison to the processes that can be practiced today. These initial pyrolyses were conducted at temperatures of less than 400 degrees Celsius, over times ranging from "many seconds" to minutes or even hours (in the case of charcoal production). Besides charcoal or carbonaceous solids, the other products were a mixture of thick liquids (in low yields and low value for producing fuels and chemicals), acids (acetic acid being the most desired acid) and gases. However, in the 1970s, it was discovered that biomass (usually wood based) could be pyrolyzed at higher temperatures but most importantly over much shorter time frames (a few seconds or less) to afford higher yields of liquid organic products (of better quality for producing chemicals and fuels) with lower yields of gases and carbonaceous solids. Therefore, the controlled, rapid heating of the biomass material (e.g., wood) can initiate depolymerization reactions in the lignin component while minimizing condensation reactions. In addition, the very short reaction times and rapid vapor quench employed in fast pyrolysis preserve the lignin polymer fragments by protecting them from prolonged exposure to high temperatures. In summary, the high intensity but very short "thermal shock" of fast pyrolysis causes the lignin component of the wood feedstock to depolymerize. In addition, the rapid heating of the biomass, i.e. wood results in thermal degradation, i.e depolymerization of both cellulose and hemicellulose components. Fast pyrolysis is the preferred way to produce pyrolytic wood tar oils for fuels and chemicals. Many species of wood can be subjected to fast pyrolysis to produce useable bio-oils or pyrolytic wood oils in this invention. In addition to U.S. Pat. No. 7,905,990, a variety of fast pyrolysis processes are also described in U.S. Pat. Nos. 4,876,108; 5,792,340; 5,853,548, 5,961,786, and 6,844,420, all of which are incorporated herein by reference in their entireties.

For purposes of the present disclosure the term "fast pyrolysis" means a pyrolysis that takes place over a time frame of from less than 1 to 60 seconds. For purposes of the present disclosure the term "rapid heating" means a heating from a first temperature of from 25 to 45 degrees Celsius to a second temperature of from 350 to 700 degrees Celsius over a time period of from $3.2 \times 10^{-4}$ to 0.6 seconds. For purposes of the present disclosure the term "very short reaction time" means a reaction time having a duration of from less than 1 to 60 seconds. The types of reactions can include but are not limited to depolymerization reactions, condensation reactions, and combinations thereof. For purposes of the present disclosure the term "rapid vapor quench" means cooling the product vapors to below 350 degrees Celsius in 0.5 seconds or less.

A wide range of temperatures can be employed in the thermal destructive distillation in order to produce the biomass pyrolysis oil, such as wood tar oil or bio-oil, for use in various embodiments to produce aqueous based asphalt emulsifiers. Suitable pyrolysis temperatures range from 350-700 degrees Celsius. Preferably, the pyrolysis temperatures range from 450-600 degrees Celsius. More preferably, the pyrolysis temperatures range from 475-550 degrees Celsius.

A wide range of heat contact times can be employed in the thermal destructive distillation in order to produce the biomass pyrolysis oil, such as wood tar oil or bio-oil, for use in various embodiments. Contact times of from less than 1 to 60 seconds are suitable. Preferred contact times are less than 5 seconds. Especially preferred contact times are less than 2 seconds.

Batch and continuous reactors of many sizes and designs have been described in the prior art. A suitable biomass pyrolysis oil, such as a bio-oil or a subsequent pyrolytic wood tar oil can be produced using many such reactors.

For the purposes of this invention, a desirable biomass pyrolysis oil, specifically a pyrolytic wood oil, is characterized as described in U.S. Pat. No. 7,905,990 with the following analyses: 10-40% water, pH of 2-5, acids content of 7-12% (on a dry weight basis), viscosity of 2-30 cST (@70 degrees Celsius). In addition, biomass pyrolysis oil, such as bio-oils, can also be characterized by an "NRP Content (wt. %)" which is based on the phenolics plus aldehydes and ketones content. "Phenolics" refers to phenolic compounds and polymers which include lignin and lignin fragments that arise from the rapid pyrolysis process. Biomass pyrolysis oils, such as bio-oils, with an NRP Content of about 10-55 wt. (corresponds to the whole oil) or higher are suitable for this invention.

According to certain embodiments, the biomass pyrolysis oil can include about 10-40% cellulose- and hemicellulose-derived saccharides and related carbohydrates (such as levoglucosan), 10-40% lignin and depolymerized lignin derivatives (primarily phenolic and polyphenol compounds), 1-15% aldehydes and ketones, 1-15% organic acids, 0-10% furans and pyrans, 0-10% alcohols, 0-5% extractives such as fatty and resin acids, and 10-40% water.

The biomass pyrolysis oil can include cellulose- and hemicellulose-derived saccharides and related carbohydrates (such as levoglucosan) in an amount within a range having a lower limit and/or an upper limit. The range can include or exclude the lower limit and/or the upper limit. The lower limit and/or upper limit can be selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 percent by weight based on the total weight of the biomass pyrolysis oil. For example, according to certain preferred embodiments, the biomass pyrolysis oil can include cellulose- and hemicellulose-derived saccharides and related carbohydrates (such as levoglucosan) in an amount of from about 10-40 percent by weight based on the total weight of the biomass pyrolysis oil.

The biomass pyrolysis oil can include lignin and depolymerized lignin derivatives (primarily phenolic and polyphenol compounds) in an amount within a range having a lower limit and/or an upper limit. The range can include or exclude the lower limit and/or the upper limit. The lower limit and/or upper limit can be selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 based on the total weight of the biomass pyrolysis oil. For example, according to certain preferred embodiments, the biomass pyrolysis oil can include lignin and depolymerized lignin derivatives (primarily phenolic and polyphenol compounds) in an amount of from about 10-40 percent by weight based on the total weight of the biomass pyrolysis oil.

The biomass pyrolysis oil can include aldehydes and ketones in an amount within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, and 15 based on the total weight of the biomass pyrolysis oil. For example, according to certain preferred embodiments, the biomass pyrolysis oil can include aldehydes and ketones in an amount of from about 1-15 percent by weight based on the total weight of the biomass pyrolysis oil.

The biomass pyrolysis oil can include organic acids in an amount within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, and 15 based on the total weight of the biomass pyrolysis oil. For example, according to certain preferred embodiments, the biomass pyrolysis oil can include organic acids in an amount of from about 1-15 percent by weight based on the total weight of the biomass pyrolysis oil.

The biomass pyrolysis oil can include furans and pyrans in an amount within a range having a lower limit and/or an upper limit. The range can include or exclude the lower limit and/or the upper limit. The lower limit and/or upper limit can be selected from 0, 1, 2, 3, 4, 5, 6, 7, 8, 9, and 10 based on the total weight of the biomass pyrolysis oil. For example, according to certain preferred embodiments, the biomass pyrolysis oil can include furans and pyrans in an amount of from about 0-10 percent by weight based on the total weight of the biomass pyrolysis oil.

The biomass pyrolysis oil can include alcohols in an amount within a range having a lower limit and/or an upper limit. The range can include or exclude the lower limit and/or the upper limit. The lower limit and/or upper limit can be selected from 0, 1, 2, 3, 4, 5, 6, 7, 8, 9, and 10 based on the total weight of the biomass pyrolysis oil. For example, according to certain preferred embodiments, the biomass pyrolysis oil can include alcohols in an amount of about 0-10 percent by weight based on the total weight of the biomass pyrolysis oil.

The biomass pyrolysis oil can include extractives such as fatty and resin acids in an amount within a range having a lower limit and/or an upper limit. The range can include or exclude the lower limit and/or the upper limit. The lower limit and/or upper limit can be selected from 0, 1, 2, 3, 4, and 5 based on the total weight of the biomass pyrolysis oil. For example, according to certain preferred embodiments, the biomass pyrolysis oil can include extractives such as fatty and resin acids in an amount of about 0-5 percent by weight based on the total weight of the biomass pyrolysis oil.

The biomass pyrolysis oil can include water in an amount within a range having a lower limit and/or an upper limit. The range can include or exclude the lower limit and/or the upper limit. The lower limit and/or upper limit can be selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 based on the total weight of the biomass pyrolysis oil. For example, according to certain preferred embodiments, the biomass pyrolysis oil can include water in an amount of about 10-40 percent by weight based on the total weight of the biomass pyrolysis oil.

Regardless of the design of the pyrolysis unit itself, the vaporized products of the pyrolysis of biomass, i.e., wood can be collected with one or more devices such as condensers. The purpose of more than one condenser unit is to increase the yield of liquid product by capturing vapors that pass through the first condenser unit. Whole oils, characterized as above, with an NRP Content of about 10-55%, are the products obtained by combining the condensed products obtained from all the condensers. Whole oils are the entire liquid product from the pyrolysis of the biomass. It is also possible to produce discrete fractions of the vaporized products by segregating the condensed products from individual condensers or if multiple condensers are used, from two or more of the condensers. Fractions from the second condenser unit are usually lower in acidity than fractions from the first condenser unit. In producing anionic emulsifiers, biomass pyrolysis oil fractions with less acidity will require less alkali metal base. In addition, fractions from a second condenser have higher phenolic plus aldehydes and ketones contents, which correspond to an NRP Content of about 40-55%. According to various embodiments of the present invention, it is possible to use the whole oil or the oil from just one condenser or two or more condensers. Typically condensed products from the pyrolysis of biomass, i.e., wood are subjected to processes, such as filtration to separate undesirable solid products, usually referred to as char. Char is best described as carbonaceous solids, that is mostly elemental carbon resulting from the high processing temperatures.

According to various embodiments, subsequent processing of a biomass pyrolysis oil can include physically separating free water, optionally followed by washing the biomass pyrolysis oil with water to remove any water soluble components to produce the final biomass pyrolysis oil, such as a pyrolytic wood tar oil or bio-oil. Optionally, the biomass pyrolysis oil, such as a pyrolytic wood tar oil, may be treated with ammonium hydroxide, an alkali metal hydroxide or mixtures thereof to reduce the corrosivity and facilitate easier handling and storage. The alkali metal hydroxide can include an alkali metal selected from lithium (Li), sodium (Na), potassium (K), rubidium (Rb), caesium (Cs), and francium (Fr).

Asphalt emulsifiers can be prepared by reacting a biomass pyrolysis oil as is (after physical separation of water) with sufficient quantities of an alkali metal hydroxide, or ammonium hydroxides or mixtures thereof to produce a desired pH. Suitable ranges of alkali metal hydroxides per 100 parts of biomass pyrolysis oil are: 10-50 parts sodium hydroxide (solid NaOH basis); 14-70 parts potassium hydroxide (solid KOH basis) and 9-44 parts ammonium hydroxide (on an NH$_4$OH basis). Preferable ranges of alkali metal hydroxides per 100 parts of biomass pyrolysis oil are: 20-30 parts sodium hydroxide (solid NaOH basis); 28-42 parts potassium hydroxide (solid KOH basis) and 18-26 parts ammonium hydroxide (on an NH$_4$OH basis). Optionally asphalt emulsifiers can be prepared by reacting a water washed biomass pyrolysis oil with an alkali metal hydroxide to increase the pH. This reaction is followed by reaction with additional alkali metal hydroxide or another alkali metal hydroxide to afford a desired pH range for an asphalt emulsifier. For purposes of the present disclosure a "desired pH" for an asphalt emulsifier can fall within a range of pHs from 7-14. Preferably the pHs are in the range of 10-13.

Suitable alkali metal hydroxides for preparing the asphalt emulsifiers are lithium hydroxide, sodium hydroxide and potassium hydroxide. Sodium hydroxide is preferred. Optionally mixtures of these alkali metal hydroxides may be used. Optionally ammonium hydroxide may be used by itself or with an alkali metal hydroxide to produce the asphalt emulsifiers.

The asphalt emulsifiers according to various embodiments can be used alone as a sole emulsifier system or they can be used in conjunction with one or more other anionic emulsifiers. Non-limiting examples of anionic emulsifiers include sulfate, phosphate, sulfonate derivatives of aliphatic (linear and branched) alcohols that are derived from petroleum or natural sources, or of alkoxylated alcohols. Examples also include sulfate and phosphate derivatives of alkylphenols, or of alkoxylated alkylphenols. Examples also include salts of fatty acids derived from glycerides, or from tall oil, or from petroleum, and also salts of rosin acids and rosin acid derivatives. Examples also include sulfate and phosphate derivatives of mixed poly(alkylene ethers). These surfactants include copolymers of polyethylene oxide, and polypropylene oxide or polybutylene oxide that are reacted with sulfating or phosphating agents.

The asphalt emulsifiers can have a solids content of 1-50%. The term "solids" refers to non-aqueous components. Solids include alkali metal or ammonium salts of lignin, lignin fractions that do not react with an alkali metal or ammonium hydroxide, cellulose and hemicellulose polymers and degradation products of cellulose and hemicellulose. Where the emulsifier contains another anionic surfactant as described above, it is considered part of the solids. Preferably the solids contents range from 20-45% and more preferably from 25-40%.

The asphalt emulsions of various embodiments contain an emulsifier comprising an alkali metal salt of a biomass pyrolysis oil, such as a pyrolytic wood tar or a bio-oil, that is optionally washed with water, then optionally treated with an alkali metal hydroxide or ammonium hydroxide, then reacted further to produce an emulsifier with a desired pH. Again, for purposes of the present disclosure a "desired pH" for an asphalt emulsifier can fall within a range of pHs from 7-14. Preferably the pHs are in the range of 10-13.

Referring to FIG. 1, a process 100 for producing an asphalt emulsifier is schematically illustrated. A biomass feed 101 can be added to a pyrolysis reactor 102. The pyrolysis product 103 from the pyrolysis reactor 102 can be fed into a separator system 104. The separator system 104 can separate Char 105 and a whole oil 106 from the pyrolysis product 103. The whole oil 106 can be fed into a primary condenser 107 along with a quench liquid 108. The overhead product 109 of the primary condenser 107 can be fed into a second condenser 113 along with a second quench liquid 111. A byproduct gas 112 can be produced as an overhead product of the secondary condenser 113. The bottom product 110 of the primary condenser 107 and the bottom product 114 of the secondary condenser 113 can be fed into a water washing unit 116 and mixed with water 115. The water washing unit 116 can produce a washed biomass pyrolysis oil, such as a pyrolytic wood oil 117, which can be fed to an alkali treatment unit 119 to be mixed with an alkali 118 to produce a treated pyrolytic wood oil 120. The treated pyrolytic wood oil 120 can optionally be stored in a storage unit 121. The pyrolytic wood oil 120 can be passed through an alkali treatment unit 123, where it is subjected to an alkali 122 to produce an asphalt emulsifier 124.

The pyrolysis reactor 102 can be an entrained-bed, upflow system in which the biomass feedstock is mixed with a recirculating stream of hot inorganic particulate solids, such as sand, which functions as a heat carrier and heat transfer medium. A recirculation system heats the particulate solids and transports the heat carrier stream through the reactor. The biomass is heated by direct contact with the heat carrier solids and thermally converted to a hot product vapor stream that passes to a separator system.

The separator system 104 can be one or more cyclones or knock-out pots in which the particulate heat transfer medium and char are sequentially removed from the reactor product vapor stream.

The primary condenser 107 can be a direct-contact column or vessel in which the reactor product vapor stream is quenched and partially condensed for recovery by a cooled liquid, which may be recycled liquid product or another suitable liquid. Alternately, an indirect-contact vessel such as a shell-and-tube heat exchanger can be used.

The secondary condenser 113 can be a direct-contact column or vessel in which the vapors not condensed in the primary condenser are further quenched and condensed for recovery by a cooled liquid, which may be recycled liquid product or another suitable liquid. Alternately, an indirect-contact vessel such as a shell-and-tube heat exchanger can be used. The secondary condenser may optionally be followed by additional product recovery devices including, but not limited to, filters and demisters.

The water washing unit 116 can be one or more tanks, columns, or other vessels in which the biomass pyrolysis oil are contacted with water, mixed, and separated into aqueous and non-aqueous phases to remove acidic and other water-soluble components.

The alkali treatment 119 and/or 123 can be one or more tanks, columns, or other vessels in which the water-washed biomass pyrolysis oils are reacted with alkali (saponified) to produce a desired pH.

The storage unit 121 can be any ordinary storage system, such as a tank, a drum suitable for holding the biomass pyrolysis oil, such as a pyrolytic wood oil 120.

Various embodiments relate to an asphalt emulsifier. The asphalt emulsifier can include at least one salt of a biomass pyrolysis oil with one selected from the group consisting of an alkali metal, and ammonia. A salt of a biomass pyrolysis oil with an alkali metal means the same as an alkali metal salt of a biomass pyrolysis oil. A salt of a biomass pyrolysis oil with ammonia means the same as an ammonium salt of a biomass pyrolysis oil. For example, the salt can be produced by a process comprising reacting the biomass pyrolysis oil with a hydroxide of lithium, sodium, potassium, and/or ammonia. Additionally or alternatively, the salt can be produced by a process comprising reacting the biomass pyrolysis oil with an oxide of lithium, sodium, potassium, and/or ammonia. The asphalt emulsifier can also include a plurality of salts of the biomass pyrolysis oil and an alkali metal, ammonia, and combinations thereof.

The biomass pyrolysis oil can include at least one condensed vapor recovered from pyrolysis of a biomass. The biomass can be wood. The wood can be from a coniferous plant. The coniferous plant can be a pine tree. The biomass pyrolysis oil can be pyrolyzed wood tar oil. The alkali metal can be, but it is not limited to lithium (Li), sodium (Na), potassium (K), rubidium (Rb), caesium (Cs), francium (Fr), and combinations thereof.

According to various embodiments, the asphalt emulsifier can have a pH within a range having a lower limit and/or an upper limit. The range can include or exclude the lower limit and/or the upper limit. The lower limit and/or upper limit can be selected from 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, and 14. For example, according to certain preferred embodiments, the asphalt emulsifier can have a pH of from about 7 to 14 or from about 10 to 13.

Various embodiments relate to a process including, but not limited to the steps of washing a biomass pyrolysis oil with water to produce a washed biomass pyrolysis oil; and treating the washed biomass pyrolysis oil to produce an asphalt emulsifier comprising at least one salt of a biomass pyrolysis oil with one selected from the group consisting of an alkali metal, and ammonia. The step of treating the washed biomass pyrolysis oil can include reacting the washed biomass pyrolysis oil with a hydroxide of lithium, sodium, potassium, and/or ammonia. The step of treating the washed biomass pyrolysis oil can include reacting the washed biomass pyrolysis oil with a hydroxide of lithium, sodium, potassium, and/or ammonia; and repeating the reacting step at least once to obtain the asphalt emulsifier with a desired pH. Additionally or alternatively, treating the washed biomass pyrolysis oil can include reacting the washed biomass pyrolysis oil with an oxide of lithium, sodium, potassium, and/or ammonia. The step of treating the washed biomass pyrolysis oil can include reacting the washed biomass pyrolysis oil with an oxide of lithium, sodium, potassium, and/or ammonia; and repeating the reacting step at least once to obtain the asphalt emulsifier with a desired pH. The desired pH can be from about 7 to 14 or any other pH of the asphalt emulsifier as specified in this disclosure.

Various embodiments relate to an asphalt emulsion including an asphalt, water, and an asphalt emulsifier. The asphalt can be suspended in the water. The asphalt emulsifier can include at least one salt of a biomass pyrolysis oil with an alkali metal, and/or ammonia. The asphalt emulsion can further include one or more additional asphalt emulsifiers. The one or more additional asphalt emulsifier can include an alkali metal salt, an ammonium salt, and combinations thereof. The alkali metal salt can include an alkali metal, including but not limited to lithium, sodium, and potassium.

The asphalt emulsion can include asphalt in an amount within a range having a lower limit and/or an upper limit. The range can include or exclude the lower limit and/or the upper limit. The lower limit and/or upper limit can be selected from 50, 51, 52, 53, 54, 55, 56, 57, 58, 59, 60, 61, 62, 63, 64, 65, 66, 67, 68, 69, 70, 71, 72, 73, 74, and 75 percent by weight based on the total weight of the asphalt emulsion. For example, according to certain preferred embodiments, the asphalt emulsion can include asphalt in an amount of from 50 to 75 percent by weight based on the total weight of the asphalt emulsion.

The asphalt emulsion can include water in an amount within a range having a lower limit and/or an upper limit. The range can include or exclude the lower limit and/or the upper limit. The lower limit and/or upper limit can be selected from 25, 26, 27, 28, 29, 30, 31, 32, 33, 34, 35, 36, 37, 38, 39, 40, 41, 42, 43, 44, 45, 46, 47, 48, 49, and 50 percent by weight based on the total weight of the asphalt emulsion. For example, according to certain preferred embodiments, the asphalt emulsion can include water in an amount of from 25 to 50 percent by weight based on the total weight of the asphalt emulsion.

The asphalt emulsion can include the asphalt emulsifier in an amount within a range having a lower limit and/or an upper limit. The range can include or exclude the lower limit and/or the upper limit. The lower limit and/or upper limit can be selected from 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, and 6 percent by weight based on the total weight of the asphalt emulsion. For example, according to certain preferred embodiments, the asphalt emulsion can include the asphalt emulsifier in an amount of from 0.5 to 6 percent by weight based on the total weight of the asphalt emulsion.

Various embodiments relate to a process for preparing an asphalt emulsion, the process can include the steps of combining an asphalt emulsifier with an asphalt in an inline mixer, a piping system, and combinations thereof to produce a mixture; processing the mixture in one selected from the group consisting of a colloid mill, a homogenizer, and combinations thereof to produce the asphalt emulsion, wherein the asphalt emulsifier comprises at least one salt of a biomass pyrolysis oil with one selected from the group consisting of an alkali metal, and ammonia.

Various embodiments relate to a process for preparing an asphalt emulsion, the process comprising: mixing an asphalt emulsifier solution with an asphalt by combining the streams in an inline mixer or piping system, and feeding the mixture to a colloid mill (or similar high-speed, high-shear homogenizer) which produces the asphalt emulsion, wherein the asphalt emulsifier comprises at least one salt of a biomass pyrolysis oil with one selected from the group consisting of an alkali metal, and ammonia.

This invention is illustrated by the following examples, which are exemplary only and not intended to be limiting. All percentages, parts, etc., are by weight, unless otherwise indicated.

Examples

Pyrolytic Wood Tar Oil

Coniferous (pine) wood was pyrolyzed using the process described in U.S. Pat. No. 5,961,786 and U.S. Pat. No. 6,844,420, which are hereby incorporated by reference in their entireties. The fraction obtained from the secondary condenser in this process was used. This biomass pyrolysis oil was first washed with water. This water washed biomass pyrolysis oil was then treated with aqueous sodium hydroxide. This treated biomass pyrolysis oil had these measurements, pH of 11.5, solids content of 35%, specific gravity (25 degrees Celsius/25 degrees Celsius) of 1.13, and viscosity of 300 centistokes at 25 degrees Celsius.

Procedure for Asphalt Emulsifier Preparation by Additional Saponification of the Treated Pyrolytic Wood Oil of the Invention:

2500 grams of treated pyrolytic wood tar oil was charged to a 5-liter round bottom flask equipped with an overhead agitator and reflux condenser. To this liquid was added 50% aqueous sodium hydroxide (NaOH) slowly and with vigorous agitation until a pH of 12.2-12.5 was obtained. A total of 85 grams of 50% NaOH was added. This solution was stirred for an additional one hour.

The resulting solution was smooth and free of undissolved solids, with these properties: pH of 12.4, total solids of 35%, specific gravity (25 degrees Celsius/25 degrees Celsius) of 1.14, and viscosity of 13 centistokes at 25 degrees Celsius.

Preparation of the Emulsifier from Vinsol® Resin:

AHI resin, i.e. Vinsol® resin was obtained from inventory of standard product at Pinova, Inc., Brunswick, Ga.

To 30 gal. of water (250 lbs) was added 4 lbs. of 25% aqueous sodium hydroxide solution or 5.6 lbs. of 25% aqueous potassium hydroxide solution. To this solution was then added with vigorous stirring 100 lbs. of pulverized Vinsol® resin. The stirring was continued for about 10 minutes. When the particles of emulsifier were thoroughly dispersed, 40 lbs. of 25% sodium hydroxide solution or 56 lbs. of 25% potassium hydroxide solution were added, and stirring was continued for 20 to 30 minutes until the solution had a uniform appearance. The resulting solution was approximately 27% solids and was diluted further with water to any lower solids content desired.

Procedure for the Preparation of the Asphalt Emulsions:

The emulsifier solution of the invention was tested at usage levels of 2.8% and 5.6% based on the total weight of the emulsion. This is equivalent to 1% and 2% active emulsifier content. The asphalt used was Flint Hill Resources PG 64-22. SS-1 h asphalt emulsions were prepared in a colloid mill.

Testing of the Emulsions

Testing of the emulsions and dried emulsion residues was carried out with the following tests.

Composition Tests

ASTM D244 (1993): Residue by Evaporation measures percent residual asphalt solids in emulsion.

Stability Tests

ASTM D244 (1993): Cement Mixing measures the chemical stability, percent break, between emulsifier and asphalt, e.g. the stability of the emulsion when it mixes with and coats mineral aggregate.

ASTM D244 (1993): Sieve Test measures amount of coalesced asphaltic material that is present in emulsion.

Results for the emulsion tests are presented in Table 1.

TABLE 1

|  | Invention | Invention | Vinsol | Vinsol | ASTM Specifications |
|---|---|---|---|---|---|
| Emulsifier Dosage Level, % | 2.80 | 5.60 | 1.00 | 2.00 |  |
| Active Emulsifier Content, % | 1.0 | 2.0 | 1.0 | 2.0 |  |
| Sieve, % | 0.02 | Trace | 0.00 | 0.00 | 0.1% max. |
| Residue, % | 59.98 | 59.90 | 60.30 | 61.77 | 57% min. |
| Cement Mix, % | 26.70 | 1.01 | 25.00 | 20.65 | 2% max. |
| Mean Particle Size, μ | 4.07 | 3.02 | 2.29 | 1.96 |  |
| Particle Size >90%, μ | 5.26 | 4.02 | 2.91 | 2.49 |  |

The data in Table 1 indicates that the emulsifier of the invention produces satisfactory asphalt emulsions with properties similar to Vinsol® resin, a well-accepted commercial emulsifier.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

What is claimed is:

1. An asphalt emulsifier comprising at least one salt of a liquid biomass pyrolysis oil with one selected from the group consisting of an alkali metal, and ammonia.

2. The asphalt emulsifier according to claim 1, wherein the biomass pyrolysis oil comprises at least one condensed vapor recovered from pyrolysis of a biomass.

3. The asphalt emulsifier according to claim 2, wherein the biomass is wood.

4. The asphalt emulsifier according to claim 3, wherein the wood is from a coniferous plant.

5. The asphalt emulsifier according to claim 4, wherein the coniferous plant is a pine tree.

6. The asphalt emulsifier according to claim 1, wherein the biomass pyrolysis oil is pyrolyzed wood tar oil.

7. The asphalt emulsifier according to claim 1, wherein the alkali metal is selected from the group consisting of lithium (Li), sodium (Na), potassium (K), rubidium (Rb), caesium (Cs), and francium (Fr).

8. The asphalt emulsifier according to claim 1, where the salt is produced by a process comprising reacting the biomass pyrolysis oil with a hydroxide of one selected from the group consisting of lithium, sodium, potassium, and ammonia.

9. The asphalt emulsifier according to claim 1, where the salt is produced by a process comprising reacting the biomass pyrolysis oil with an oxide of one selected from the group consisting of lithium, sodium, potassium, and ammonia.

10. The asphalt emulsifier according to claim 1, comprising a plurality of salts of the biomass pyrolysis oil.

11. The asphalt emulsifier according to claim 1, wherein the asphalt emulsifier has a pH of from about 7 to 14.

12. The asphalt emulsifier according to claim 1, wherein the asphalt emulsifier has a pH of from about 10 to 13.

13. An asphalt emulsion comprising an asphalt, water, and an asphalt emulsifier, wherein the asphalt is suspended in the water, and wherein the asphalt emulsifier comprises at least one salt of a liquid biomass pyrolysis oil with one selected from the group consisting of an alkali metal, and ammonia.

14. The asphalt emulsion according to claim 13, comprising from 50 to 75 wt. % of the asphalt, from 25 to 50 wt. % of water, and from 0.5 to 6 wt. % of the asphalt emulsifier.

15. The asphalt emulsion according to claim 13, further comprising a second asphalt emulsifier, wherein the second asphalt emulsifier comprises one selected from the group consisting of an alkali metal salt, an ammonium salt, and combinations thereof.

16. The asphalt emulsion according to claim 15, wherein the alkali metal salt comprises an alkali metal, and wherein the alkali metal is one selected from the group consisting of lithium, sodium, and potassium.

* * * * *